US011591251B2

(12) United States Patent
Bando

(10) Patent No.: US 11,591,251 B2
(45) Date of Patent: Feb. 28, 2023

(54) GLASS PLATE BEND-BREAKING MACHINE

(71) Applicant: BANDO KIKO CO., LTD., Tokushima (JP)

(72) Inventor: Kazuaki Bando, Tokushima (JP)

(73) Assignee: BANDO KIKO CO., LTD., Tokushima (JP)

( * ) Notice: Subject to any disclaimer, the term of this patent is extended or adjusted under 35 U.S.C. 154(b) by 0 days.

(21) Appl. No.: 16/629,817

(22) PCT Filed: Jul. 5, 2019

(86) PCT No.: PCT/JP2019/026812
§ 371 (c)(1),
(2) Date: Jan. 9, 2020

(87) PCT Pub. No.: WO2020/084840
PCT Pub. Date: Apr. 30, 2020

(65) Prior Publication Data
US 2021/0061700 A1    Mar. 4, 2021

(30) Foreign Application Priority Data

Oct. 22, 2018  (JP) .............................. JP2018-198809

(51) Int. Cl.
*C03B 33/03* (2006.01)
*C03B 33/033* (2006.01)

(52) U.S. Cl.
CPC ............ *C03B 33/03* (2013.01); *C03B 33/033* (2013.01)

(58) Field of Classification Search
CPC ..... C03B 33/03; C03B 33/033; C03B 33/078; C03B 33/07; C03B 33/0207; B28D 5/00;
(Continued)

(56) References Cited

U.S. PATENT DOCUMENTS

| 1,972,210 A | 9/1934 | Waldron |
| 4,371,103 A * | 2/1983 | Siemens ................ C03B 33/04 225/1 |

(Continued)

FOREIGN PATENT DOCUMENTS

| CN | 1809512 B | 11/2012 |
| JP | 8-217475 | 8/1996 |

(Continued)

OTHER PUBLICATIONS

Taiwanese Office Action dated Oct. 21, 2020 in Taiwanese Application No. 108137009, with English machine translation, 8 pages.

(Continued)

*Primary Examiner* — Ghassem Alie
(74) *Attorney, Agent, or Firm* — Nixon & Vanderhye P.C.

(57) ABSTRACT

A glass plate bend-breaking machine for a glass plate includes a supporting mechanism by which a glass plate with a predetermined bend-breaking line as a cut line formed on an upper surface, i.e., one surface, thereof is supported at a lower surface, i.e., another surface, of the glass plate; and press-breaking devices and for press-breaking the glass plate along the predetermined bend-breaking line. Each of the press-breaking devices has a pressing body for simultaneously pressing a plurality of parts and along the predetermined bend-breaking line on the upper surface of the glass plate at the time of press-breaking the glass plate along the predetermined bend-breaking line at each of press-breaking positions on the glass plate.

9 Claims, 8 Drawing Sheets

(58) Field of Classification Search
CPC ...... B28D 7/04; B28D 5/0052; B28D 5/0011; B28D 5/0041; B28D 1/225; B26F 3/00; B65G 2249/04; B65G 49/064; B65G 49/066; Y10T 225/321; Y10T 225/12; Y10T 225/307; Y10T 83/0333; Y10T 83/0341; Y10T 225/314; Y10T 225/625
USPC ............ 225/96.5, 96, 94, 2, 95, 97, 93, 103; 83/880; 451/44, 70; 414/806, 225.01
See application file for complete search history.

(56) References Cited

U.S. PATENT DOCUMENTS

| | | | | |
|---|---|---|---|---|
| 6,218,793 B1* | 4/2001 | Bando | ................... | C03B 33/027 225/96.5 |
| 8,276,796 B2* | 10/2012 | Nishisaka | ............ | B28D 5/0029 225/93 |
| 2007/0158381 A1* | 7/2007 | Lisec | .................... | C03B 33/033 225/2 |
| 2010/0012697 A1* | 1/2010 | Margaria | .............. | C03B 33/078 225/2 |
| 2015/0076203 A1* | 3/2015 | Mishina | ................ | C03B 33/033 225/96 |
| 2017/0334761 A1* | 11/2017 | Bando | ................... | C03B 33/033 |
| 2018/0222785 A1 | 8/2018 | Bando | | |

FOREIGN PATENT DOCUMENTS

| | | |
|---|---|---|
| JP | 11-171573 | 6/1999 |
| JP | 2015-223818 | 12/2015 |
| JP | 2017-39271 | 2/2017 |
| JP | 2017-177452 | 10/2017 |
| JP | 2017-226549 | 12/2017 |
| TW | I593649 B | 8/2017 |
| TW | 201815702 A | 5/2018 |
| WO | 2004/096721 | 11/2004 |

OTHER PUBLICATIONS

International Search Report for PCT/JP2019/026812, dated Sep. 10, 2019, 3 pages.

* cited by examiner

GLASS PLATE BEND-BREAKING MACHINE

This application is the U.S. national phase of International Application No. PCT/JP2019/026812 filed 5 Jul. 2019, which designated the U.S. and claims priority to JP Patent Application No. 2018-198809 filed 22 Oct. 2018, the entire contents of each of which are hereby incorporated by reference.

TECHNICAL FIELD

The present invention relates to a glass plate bend-breaking machine.

BACKGROUND ART

Glass plate bend-breaking machines are known in which a press-breaking device is moved within a plane, which is parallel to a surface of a glass plate placed on an endless belt, and along a bend-breaking line formed on the glass plate, while a glass plate receiving device is moved below the endless belt in correspondence with the movement of the press-breaking device.

PRIOR ART DOCUMENT

Patent Document

[Patent Document 1] JP-A-H8-217475

SUMMARY OF THE INVENTION

Problems that the Invention is to Solve

In such a glass plate bend-breaking machine, at the time of press-breaking a glass plate along a cut line, generally, a glass plate receiving surface of the glass plate receiving device is disposed on a lower surface of the glass plate, and a push rod is consecutively pressed against one part of an upper surface of the glass plate whose lower surface is supported by such a glass plate receiving surface, thereby bend-breaking the glass plate along the bend-breaking line. Therefore, with each pressing against the one part of the upper surface of the glass plate by the push rod, bend-breaking becomes unstable, and there occurs a possibility that desired bend-breaking cannot be effected.

The present invention has been devised in view of the above-described aspects, and its object is to provide a glass plate bend-breaking machine which is capable of effecting stable bend-breaking at each bend-breaking position.

Means for Solving the Problems

A glass plate bend-breaking machine in accordance with the present invention is comprised of: a supporting mechanism by which a glass plate with a cut line formed on one surface thereof is supported at another surface of the glass plate; and a press-breaking device for press-breaking the glass plate along the cut line, wherein the press-breaking device has a pressing body for simultaneously pressing a plurality of parts along the cut line on the one surface of the glass plate at the time of press-breaking the glass plate along the cut line at each press-breaking position on the glass plate.

According to such a glass plate bend-breaking machine in accordance with the present invention, since the pressing body is adapted to simultaneously press the plurality of parts along the cut line on the one surface of the glass plate at the time of press-breaking the glass plate along the cut line, it is possible to effect stable bend-breaking at each bend-breaking position.

In the present invention, in a preferred embodiment, the pressing body has a flat surface or a curved convex surface constituted by a partial spherical surface or a partial cylindrical surface, the flat surface or the curved convex surface being adapted to come into contact with at least one part among the plurality of parts in pressing of the plurality of parts along the cut line on the one surface of the glass plate at the time of press-breaking the glass plate along the cut line. In another preferred embodiment, the pressing body has at least one rotary body, and the rotary body has a contacting surface which is rotatably or nonrotatably brought into contact with at least one part among the plurality of parts in pressing of the plurality of parts along the cut line on the one surface of the glass plate at the time of press-breaking the glass plate along the cut line.

Such a rotary body, in a preferred embodiment, has a rotational axis which extends in a direction intersecting a direction along the cut line, and the contacting surface is adapted to be brought into contact with at least one part among the plurality of parts rotatably or nonrotatably about the rotational axis in pressing of the plurality of parts along the cut line on the one surface of the glass plate at the time of press-breaking the glass plate along the cut line.

In the present invention, the pressing body may be adapted to press the one surface of the glass plate in such a manner as to straddle the cut line at at least one part among the plurality of parts along the cut line on the one surface of the glass plate at the time of press-breaking the glass plate along the cut line.

In the glass plate bend-breaking machine in accordance with the present invention, the press-breaking device may further have a rotating means for rotating the pressing body about an axis perpendicular to the one surface of the glass plate so as to allow the pressing body to effect simultaneous pressing of the plurality of parts on the glass plate along the cut line at each press-breaking position on the glass plate, or may further have a pressing-force imparting means for imparting to the pressing body a pressing force necessary for simultaneous pressing by the pressing body with respect to the plurality of parts along the cut line on the one surface of the glass plate at the time of press-breaking the glass plate along the cut line.

The glass plate bend-breaking machine in accordance with the present invention may be comprised of: a flexible member on which the glass plate with the cut line formed thereon is placed; a glass plate receiving device having a glass plate receiving surface for receiving the glass plate from the other surface of the glass plate through the flexible member; a first moving device for moving the glass plate receiving device; and a second moving device for moving the press-breaking device, wherein the supporting mechanism preferably has a supporting surface for supporting the glass plate at the other surface of the glass plate through the flexible member.

In a preferred embodiment in accordance with the present invention, the glass plate receiving device has a raising and lowering means for raising and lowering the glass plate receiving surface, and the glass plate receiving surface may be constantly disposed above the supporting surface of the supporting mechanism irrespective of press-breaking of the glass plate along the cut line by the pressing body. However, if such a raising and lowering means is provided, deflection can be produced in advance in the glass plate in the press-breaking of the glass plate along the cut line, with the result that it is possible to more reliably effect the press-breaking of the glass plate along the cut line by the pressing body of the press-breaking device, and to avoid unnecessary pressing against the flexible member by the glass plate receiving surface, making it possible to reduce damage to the flexible member. In this case, the amount by which the glass plate receiving surface is disposed above the supporting surface of the supporting mechanism or the amount of raising or lowering by the raising and lowering means is determined by the size and thickness of the glass plate, bend-breaking width (cullet width), and the like, and is 1 mm to 5 mm or thereabouts in a preferred embodiment; however, the present invention is not limited to the same.

In the present invention, in a preferred embodiment, the first moving device has a moving mechanism for moving the glass plate receiving surface within a plane parallel to the surface of the glass plate in one direction and another direction intersecting the one direction, and the second moving device has a moving mechanism for moving the pressing body within a plane parallel to the surface of the glass plate in the one direction and the other direction intersecting the one direction.

In still another preferred embodiment of the present invention, the flexible member has an endless belt, and the glass plate bend-breaking machine includes a tension imparting means for imparting tension to the endless belt and a traveling means for causing the endless belt to travel.

In the present invention, the glass plate receiving surface, in a preferred embodiment, may have a flat surface for receiving a lower surface of the glass plate through the flexible member, and such a flat surface in terms of an outer shape thereof may be a circular shape, an elliptical shape, a triangular shape or a further polygonal shape. Meanwhile, the glass plate receiving surface may have, instead of such a flat surface, a convex surface including a partial conical convex surface or a partial spherical convex surface.

As glass plates to be bend-broken by the bend-breaking machine of the present invention, it is possible to cite, by way of example, window glass plates for general structures, glass plates for furniture, and glass plates for automobiles, such as front glass, rear glass, and side glass, as well as glass plates for display screens in such as computers and mobile phones, but other glass plates can be also included.

As the flexible member in the present invention, a flexible endless belt, which is a flexible endless member, can be cited as a preferred embodiment, but a flexible ended sheet may be alternatively used.

Advantages of the Invention

According to the present invention, it is possible to provide a glass plate bend-breaking machine which is capable of effecting stable bend-breaking at each bend-breaking position.

MODE FOR CARRYING OUT THE INVENTION

Figure 1:
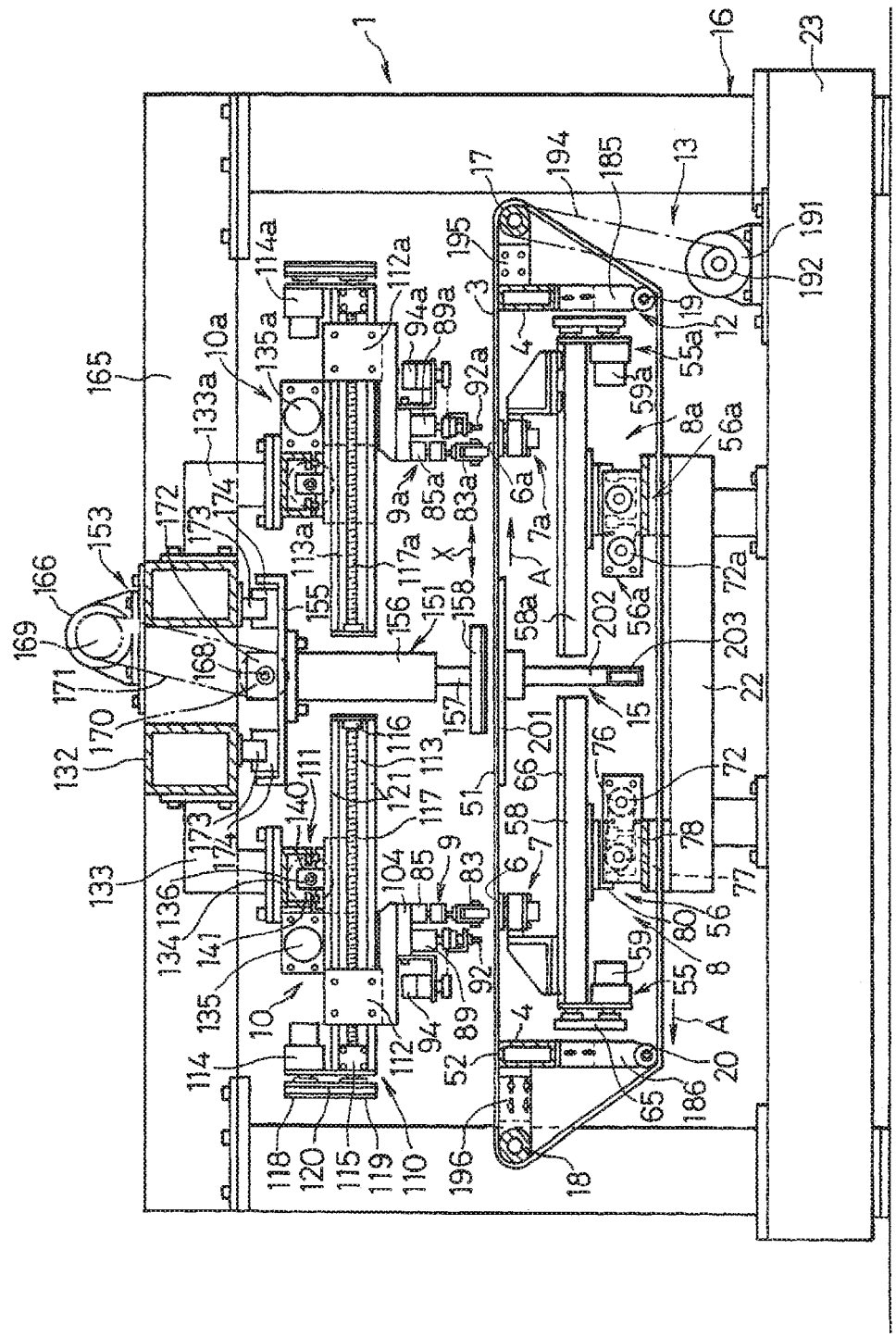
FIG. 1 is an explanatory side elevational view of a preferred embodiment of the present invention.
Figure 2:
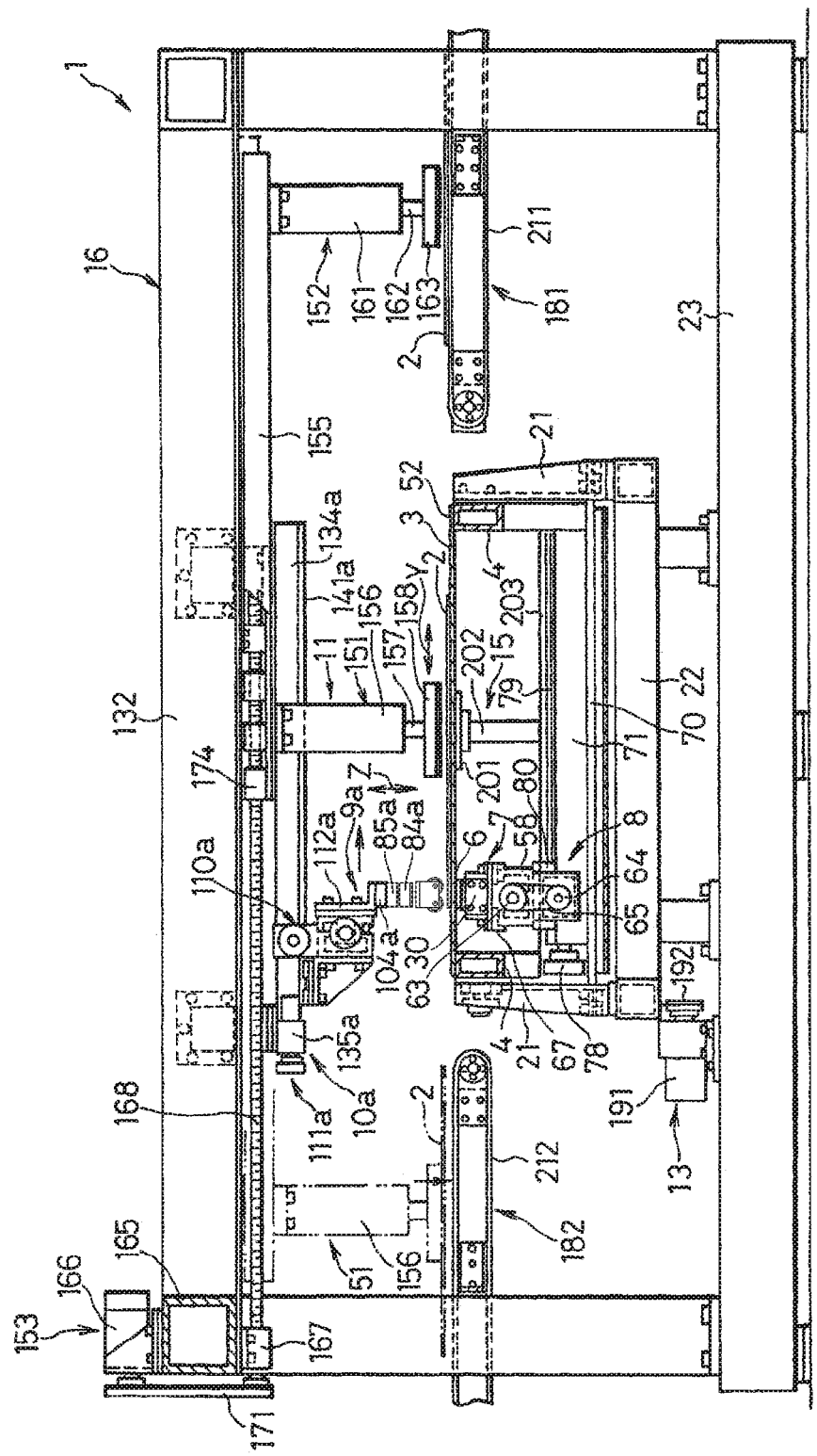
FIG. 2 is an explanatory front elevational view of the embodiment shown in FIG. 1.
Figure 3:
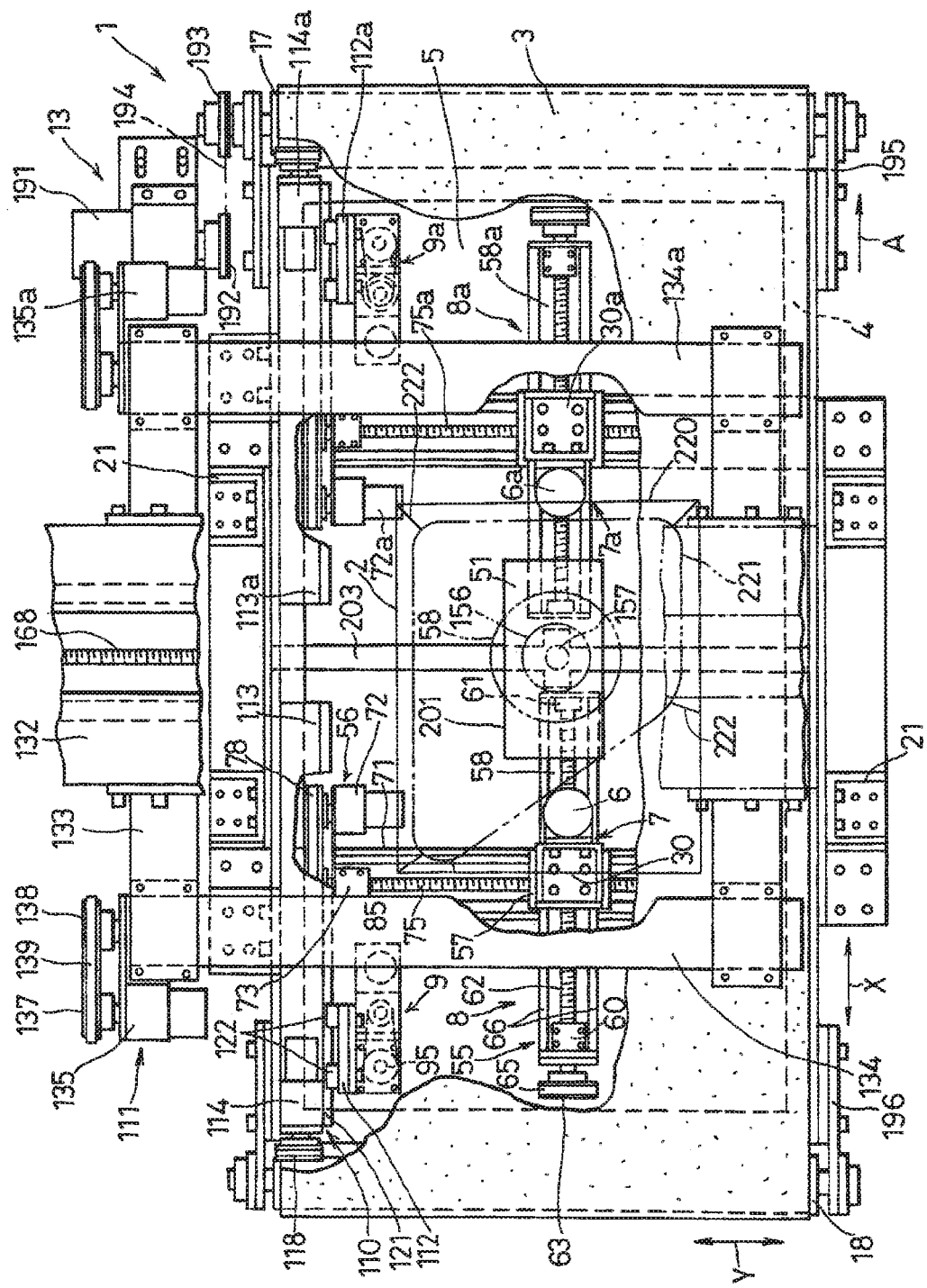
FIG. 3 is an explanatory plan view in which an endless belt, a supporting member, and the like are partly broken away in the embodiment shown in FIG. 1.
Figure 4:
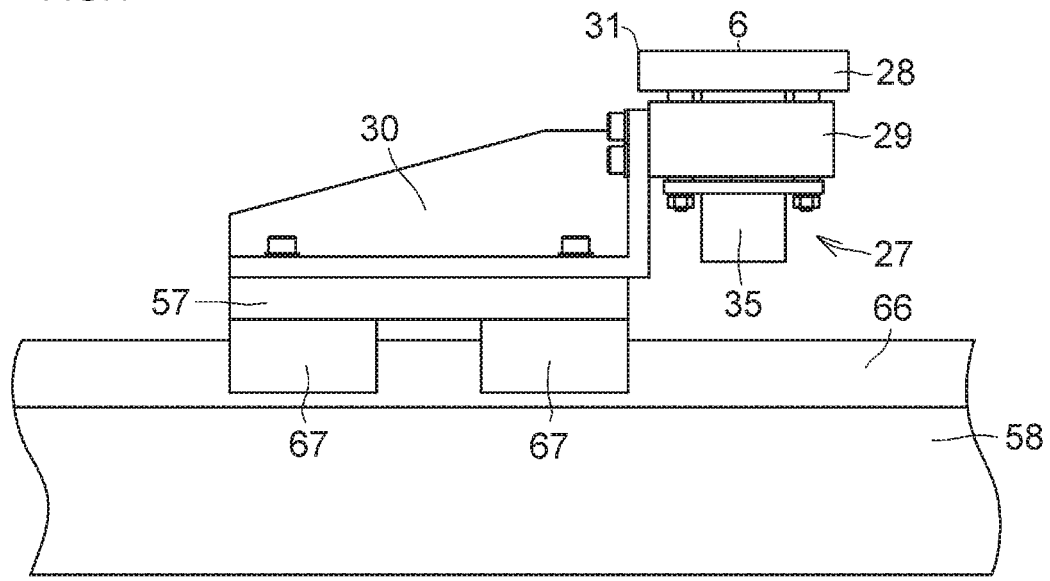
FIG. 4 is a detailed explanatory side elevational view of a glass plate receiving device in the embodiment shown in FIG. 1.
Figure 5:
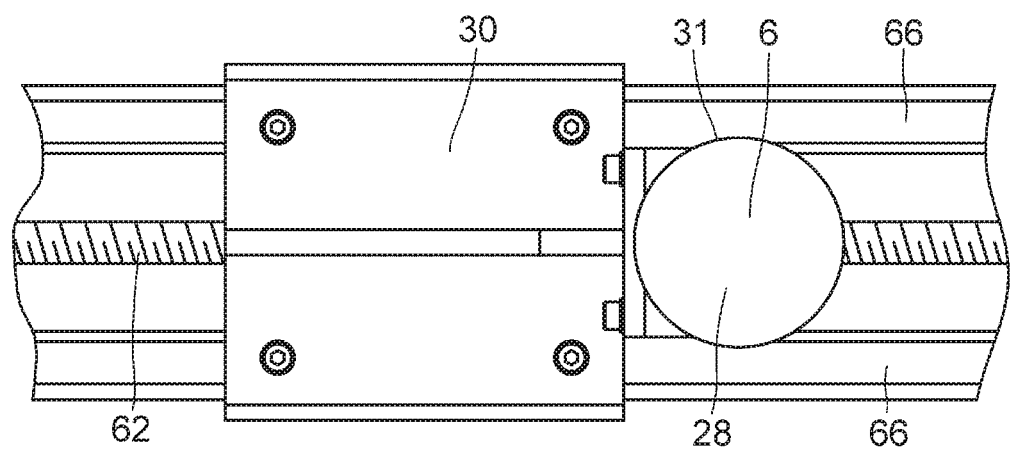
FIG. 5 is a detailed explanatory plan view of the glass plate receiving device in the embodiment shown in FIG. 1.

Hereafter, a more detailed description will be given of the present invention with reference to the embodiment shown in the drawings. The above-described aspects and other aspects of the present invention will become apparent therefrom. It should be noted that the present invention is not limited to the embodiment.

In FIGS. 1 to 8, a glass plate bend-breaking machine 1 in accordance with this embodiment is comprised of: a flexible endless belt 3 serving as a flexible member on which a glass plate 2 is placed; a supporting member 4 for supporting a peripheral portion of an upper side portion of the endless belt 3 from a lower surface side thereof; a plurality of, in this embodiment two, glass plate receiving devices 7 and 7a which respectively have glass plate receiving surfaces 6 and 6a for receiving the glass plate 2 having an upper surface as one surface from a lower surface as another surface of the glass plate 2 through the endless belt 3 inside a region 5 surrounded by the supporting member 4, and which are disposed below the upper side portion of the endless belt 3; moving devices 8 and 8a for moving the respective ones of the glass plate receiving devices 7 and 7a within a plane parallel to a surface of the glass plate 2, i.e., in an X direction, which is one direction within the horizontal plane in this embodiment, and in another direction intersecting the X direction, i.e., in a Y direction perpendicular to the X direction in this embodiment; a plurality of, in this embodiment two, press-breaking devices 9 and 9a disposed above the upper side portion of the endless belt 3 and respectively adapted to press-break the glass plate 2 along predetermined bend-breaking lines (main cut lines) 221 serving as cut lines formed on the upper surface of that glass plate 2; moving devices 10 and 10a for respectively moving the press-breaking devices 9 and 9a in the X direction which is the one direction within the horizontal plane and in the other direction intersecting the X direction, i.e., in the Y direction perpendicular to the X direction in this embodiment; a carrying-in and carrying-out means 11 for carrying into the region 5 the glass plate 2 to be subjected to bend-breaking, and for carrying out of the region 5 the glass plate 2 subjected to bend-breaking; a tension imparting means 12 for imparting tension to the endless belt 3; a traveling device 13 for causing the endless belt 3 to travel in an A direction in the X direction; a supporting mechanism 15 having an upper surface 51 serving as a supporting surface for supporting through the endless belt 3 the glass plate 2, with the predetermined bend-breaking lines 221 formed on the upper surface thereof, at a central portion of the lower surface of the glass plate 2; and a frame 16.

Since both glass plate receiving devices 7 and 7a, both moving devices 8 and 8a, both press-breaking devices 9 and 9a, and both moving devices 10 and 10a are respectively constructed identically, a description will be given below of only the glass plate receiving device 7, the moving device 8, the press-breaking device 9, and the moving device 10 except for especially necessary cases, and those devices corresponding thereto will be only illustrated by attaching a to the same reference numerals.

The endless belt 3 is trained around a driving drum 17, a driven drum 18, and freely rotating drums 19 and 20.

The supporting member 4 formed of a hollow rectangular member is supported by a base 23 of the frame 16 through a bracket 21 and an intermediate base 22 of the frame 16. The supporting member 4 may be formed of a plate-shaped member instead of the hollow rectangular member. In short, it suffices if the supporting member 4 is capable of supporting the upper side portion of the endless belt 3 from the lower surface side thereof and of ensuring that the upper side portion of the endless belt 3 does not sag to an extremely degree. Therefore, the supporting member 4 may be omitted insofar as tension can be imparted to the endless belt 3 in a desired manner to ensure that the upper side portion of the endless belt 3 does not sag to an extremely degree. In addition, if the driving drum 17 and the driven drum 18 are provided as in this embodiment, the driving drum 17 and the driven drum 18 may be made to function as parts of the supporting member 4, and portions in the supporting member 4 which extend in parallel to the driving drum 17 and the driven drum 18 may be omitted.

The glass plate receiving device 7 includes a raising and lowering means 27 for the glass plate receiving surface 6, which raises by 1 mm to 5 mm or thereabouts the glass plate receiving surface 6 in contact with the lower surface of the upper side portion of the endless belt 3, and lowers the glass plate receiving surface 6 to an original position thereof after the raising; a movable receiving member 28 on one end surface of which the glass plate receiving surface 6 is formed; a supporting member 29 on which the movable receiving member 28 is mounted so as to be vertically movable; and a base 30 on which the supporting member 29 is mounted. The raising and lowering means 27 has a cylinder unit 35 which is mounted on the supporting member 29 and has a piston rod which is movably passed through the supporting member 29 and is connected to the movable receiving member 28. The cylinder unit 35 may be constituted by an air cylinder unit or may be a hydraulic cylinder unit and is adapted to raise and lower the movable receiving member 28 by the operation thereof through the piston rod.

The flat glass plate receiving surface 6, which has a circular outer contour 31 and extends parallel to the lower surface of the glass plate 2, when not raised by the raising and lowering means 27, is disposed parallel to the upper surface 51 of the supporting mechanism 15 and an upper surface 52 serving as the supporting surface of the supporting member 4 and at the same height as the upper surface 51 and the upper surface 52. Meanwhile, the glass plate receiving surface 6, when raised by the raising and lowering means 27, is disposed 1 mm to 5 mm or thereabouts higher than the upper surface 51 and the upper surface 52.

The moving device 8 is constituted by an X-direction moving mechanism 55 and a Y-direction moving mechanism 56.

The X-direction moving mechanism 55 includes: an X-direction linearly moving base 57 on which the base 30 is mounted; an electric motor 59 attached to a horizontal member 58; a threaded shaft 62 supported rotatably by the horizontal member 58 through bearings 60 and 61; pulleys 63 and 64, which are respectively secured to an output rotating shaft of the electric motor 59 and one end of the threaded shaft 62, as well as a belt 65 trained between the pulleys 63 and 64, so as to transmit the rotation of the output rotating shaft of the electric motor 59 to the threaded shaft 62; a nut (not shown) threadedly engaged with the threaded shaft 62 and secured by being fixed to a lower surface of the linearly moving base 57; a pair of rails 66 formed on the horizontal member 58; and a slider 67 fitted slidably to the pair of rails 66 and secured by being attached to the lower surface of the linearly moving base 57.

The linearly moving base 57 is adapted to move linearly in the X direction while being guided by the pair of rails 66 when the threaded shaft 62 is rotated by means of the pulleys 63 and 64 and the belt 65 as the electric motor 59 is operated to rotate the output rotating shaft thereof.

The Y-direction moving mechanism 56 is constructed in substantially the same way as the X-direction moving mechanism 55, and includes: the horizontal member 58 serving as a Y-direction linearly moving base; a horizontal member 71 fixedly mounted on top of the intermediate base 22 by means of a supporting member 70, the bracket 21, and the like; an electric motor 72 attached to the horizontal member 71; a threaded shaft 75 supported rotatably by the horizontal member 71 through bearings 73 and 74; pulleys 76 and 77, which are respectively secured to an output rotating shaft of the electric motor 72 and one end of the threaded shaft 75, as well as a belt 78 trained between the pulleys 76 and 77, so as to transmit the rotation of the output rotating shaft of the electric motor 72 to the threaded shaft 75; a nut (not shown) threadedly engaged with the threaded shaft 75 and secured by being fixed to a lower surface of the horizontal member 58; a pair of rails 79 formed on the horizontal member 71; and a slider 80 fitted slidably to the pair of rails 79 and secured by being attached to the lower surface of the horizontal member 58.

The horizontal member 58 is adapted to move linearly in the Y direction while being guided by the pair of rails 79 when the threaded shaft 75 is rotated by means of the pulleys 76 and 77 and the belt 78 as the electric motor 72 is operated to rotate the output rotating shaft thereof. In addition, as the horizontal member 58 is moved linearly in the Y direction, the linearly moving base 57 is similarly moved linearly in the Y direction.

The press-breaking device 9 includes: a pressing body 83 which simultaneously presses downward in a vertical direction, i.e., in a Z direction a plurality of parts, i.e., two parts 81 and 82 in this embodiment, along the predetermined bend-breaking line 221 on the upper surface of the glass plate 2 at the time of press-breaking the glass plate 2 along the predetermined bend-breaking lines 221 at the respective press-breaking positions on the glass plate 2, e.g., at the respective positions of the press-breaking positions P1, P2, P3, P4 and P5; an air cylinder unit 84 serving as a pressing-force imparting means for imparting to the pressing body 83 a downward pressing force F which is directed toward the upper surface of the glass plate 2 and is necessary for simultaneous pressing by the pressing body 83 against the two parts 81 and 82 along the predetermined bend-breaking line 221 on the upper surface of the glass plate 2 at the time of press-breaking of the glass plate 2 along the predetermined bend-breaking line 221; an electric motor 85 serving as a rotating means for rotating the pressing body 83 in an R1 direction about an axis (rotational axis) O1 perpendicular to the upper surface of the glass plate 2 so as to allow the pressing body 83 to effect simultaneous pressing at the plurality of parts 81 and 82 of the glass plate 2 along the predetermined bend-breaking line 221 at the respective positions of the press-breaking positions P1, P2, P3, P4 and P5 on the glass plate 2; an air cylinder unit 89; a cutter block 93 attached to a piston rod 90 of the air cylinder unit 89 by means of a bearing mechanism 91 and having a cutter wheel 92 at a tip thereof an electric motor 94; a pulley or gear 95 attached to an output rotating shaft of the electric motor 94; a bearing mechanism 98 attached to a cylinder tube 96 of the air cylinder unit 89 by means of a bracket 97; a pulley or gear 99 attached to the bearing mechanism 98; a timing belt or chain 100 trained between the gear 95 and the gear 99; an engaging member 102 which is attached to the gear 99 and in which a slit 101 is formed; an engaging piece 103 having one end portion disposed in the slit 101 and the other end portion attached to the cutter block 93; and a base 104 on which the electric motors 85 and 94 and the air cylinder unit 89 are mounted.

The pressing body 83 includes a supporting base 106 which is coupled and fixed to a piston rod 130 of the air cylinder unit 84 and has a bifurcated portion, as well as at least one, i.e., in this embodiment two, rotary bodies 108 and 109 which are supported at the bifurcated portion of the supporting base 106 by means of shafts 107 rotatably in an R3 direction about respective rotational axes O2 and O3 extending in a direction parallel to the upper surface of the glass plate 2 and intersecting, i.e., in this embodiment perpendicular to, a direction along the predetermined bend-breaking line 221. The rotary body 108 has a cylindrical rotatable surface 301 serving as a contacting surface which is brought into rotatable contact with at least one part, i.e., in this embodiment the part 81, of the plurality of parts 81 and 82 in simultaneous pressing against the plurality of parts 81 and 82 along the predetermined bend-breaking line 221 on the upper surface of the glass plate 2 at the time of press-breaking of the glass plate 2 along the predetermined bend-breaking line 221 by the pressing body 83. The rotary body 109 also has a cylindrical rotatable surface 302 serving as a contacting surface which is brought into rotatable contact with at least one part, i.e., in this embodiment the part 82, of the plurality of parts 81 and 82 in simultaneous pressing against the plurality of parts 81 and 82 along the predetermined bend-breaking line 221 on the upper surface of the glass plate 2 at the time of press-breaking of the glass plate 2 along the predetermined bend-breaking line 221 by the pressing body 83.

In the pressing by the pressing body 83 against the plurality of parts 81 and 82 along the predetermined bend-breaking line 221 on the upper surface of the glass plate 2 at the time of press-breaking of the glass plate 2 along the predetermined bend-breaking line 221, the rotatable surface 301 is adapted to be brought into contact with at least one part, i.e., in this embodiment the part 81, of the plurality of parts 81 and 82 rotatably about the rotational axis O2. Moreover, the rotatable surface 301 is formed with a width in an extending direction of the rotational axis O2 so as to press the upper surface of the glass plate 2 in such a manner as to straddle the predetermined bend-breaking line 221 at at least one part, i.e., in this embodiment the part 81, of the plurality of parts 81 and 82 along the predetermined bend-breaking line 221 on the upper surface of the glass plate 2 at the time of press-breaking of the glass plate 2 along the predetermined bend-breaking line 221. Likewise, in the pressing by the pressing body 83 against the plurality of parts 81 and 82 along the predetermined bend-breaking line 221 on the upper surface of the glass plate 2 at the time of press-breaking of the glass plate 2 along the predetermined bend-breaking line 221, the rotatable surface 302 is adapted to be brought into contact with at least one part, i.e., in this embodiment the part 82, of the plurality of parts 81 and 82 rotatably about the rotational axis O3. Moreover, the rotatable surface 302 is formed with a width in an extending direction of the rotational axis O3 so as to press the upper surface of the glass plate 2 in such a manner as to straddle the predetermined bend-breaking line 221 at at least one part, i.e., in this embodiment the part 82, of the plurality of parts 81 and 82 along the predetermined bend-breaking line 221 on the upper surface of the glass plate 2 at the time of press-breaking of the glass plate 2 along the predetermined bend-breaking line 221.

Each of the rotary bodies 108 and 109 may be constituted by a rigid disk and an elastic annular outer surface layer covering the outer peripheral surface of this disk so that the rotatable surfaces 301 and 302 are formed as flexible elastic surfaces.

In the press-breaking device 9, as the air cylinder unit 89 is actuated to extend or retract the piston rod 90, the cutter wheel 92 is moved in the Z direction, and as the gear 95 is rotated by the operation of the electric motor 94 to rotate the gear 99 by means of the chain 100, both the engaging member 102 and the engaging piece 103 engaging with the engaging member 102 at the slit 101 are rotated about an axis (rotational axis) 105 in an R2 direction. The cutter wheel 92 is similarly rotated about the axis 105 in the R2 direction by this rotation, and its edge is directed in a direction in which a cut line is formed.

In addition, in the press-breaking device 9, as the piston rod 130 of the air cylinder unit 84 coupled and fixed to an output rotating shaft 131 of the electric motor 85 is rotated in the R1 direction due to the rotation in the R1 direction of the output rotating shaft 131 caused by the operation of the electric motor 85 at the respective positions of the press-breaking positions P1, P2, P3, P4 and P5, the two rotary bodies 108 and 109 are arrayed in the direction along the predetermined bend-breaking line 221 at the respective positions of the press-breaking positions P1, P2, P3, P4 and P5. After the rotary bodies 108 and 109 are thus arrayed, the respective rotatable surfaces 301 and 302 of the rotary bodies 108 and 109 are adapted to press with the pressing force F the upper surface of the glass plate 2 at the respective parts 81 and 82 as the pressing body 83 is lowered by the extension of the piston rod 130 due to the actuation of the air cylinder unit 84, thereby effecting press-breaking at the predetermined bend-breaking line 221 with respect to the glass plate 2 along the predetermined bend-breaking line 221 in cooperation with the glass plate receiving surface 6.

The moving device 10 is constituted by an X-direction moving mechanism 110 and a Y-direction moving mechanism 111.

The X-direction moving mechanism 110 includes: an X-direction linearly moving base 112 on which the base 104 of the press-breaking device 9 is mounted; an electric motor 114 attached to a horizontal member 113; a threaded shaft 117 supported rotatably by the horizontal member 113 through bearings 115 and 116; pulleys 118 and 119, which are respectively secured to an output rotating shaft of the electric motor 114 and one end of the threaded shaft 117, as well as a belt 120 trained between the pulleys 118 and 119, so as to transmit the rotation of the output rotating shaft of the electric motor 114 to the threaded shaft 117; a nut (not shown) threadedly engaged with the threaded shaft 117 and secured by being fixed to a lower surface of the linearly moving base 112; a pair of rails 121 formed on the horizontal member 113; and a slider 122 fitted slidably to the pair of rails 121 and secured by being attached to the lower surface of the linearly moving base 112.

The linearly moving base 112 is adapted to move linearly in the X direction while being guided by the pair of rails 121 when the threaded shaft 117 is rotated by means of the pulleys 118 and 119 and the belt 120 as the electric motor 114 is operated to rotate the output rotating shaft thereof.

The Y-direction moving mechanism 111 is constructed in substantially the same way as the X-direction moving mechanism 110, and includes: the horizontal member 113 serving as a Y-direction linearly moving base; a horizontal member 134 fixedly mounted on an upper frame 132 of the frame 16 by means of a bracket 133 and the like; an electric motor 135 attached to the horizontal member 134; a threaded shaft 136 supported rotatably by the horizontal member 134 through bearings (not shown); pulleys 137 and 138, which are respectively secured to an output rotating shaft of the electric motor 135 and one end of the threaded shaft 136, as well as a belt 139 trained between the pulleys 137 and 138, so as to transmit the rotation of the output rotating shaft of the electric motor 135 to the threaded shaft 136; a nut 140 threadedly engaged with the threaded shaft 136 and secured by being fixed to an upper surface of the horizontal member 113; a pair of rails 141 laid on the horizontal member 134; and a slider (not shown) fitted slidably to the pair of rails 141 and secured by being attached to an upper surface of the horizontal member 134. The horizontal member 134 is suspended from and supported by the horizontal member 134 through the slider and the pair of rails 141 in such a manner as to be movable in the Y direction.

The horizontal member 134 is adapted to move linearly in the Y direction while being guided by the pair of rails 141 when the threaded shaft 136 is rotated by means of the pulleys 137 and 138 and the belt 139 as the electric motor 135 is operated to rotate the output rotating shaft thereof. Thus, as the horizontal member 134 is moved linearly in the Y direction, the linearly moving base 112 is similarly moved linearly in the Y direction.

The carrying-in and carrying-out means 11 includes: a lifting mechanism 151 for lifting up the glass plate 2 which is placed on the endless belt 3 and for which bend-breaking has been completed, and for clamping the glass plate 2, which is placed on the endless belt 3, in cooperation with the supporting mechanism 15 with the endless belt 3 interposed therebetween so as to fix the glass plate 2 onto the endless belt 3 during bend-breaking; a lifting mechanism 152 for placing the glass plate 2 to be bend-broken onto the endless belt 3; and a reciprocating mechanism 153 for reciprocating the pair of lifting devices 151 and 152 in the Y direction.

The lifting mechanism 151 has an air cylinder unit 156 mounted on a movable base 155 as well as a vacuum suction device 158 attached to a distal end of a piston rod 157 of the air cylinder unit 156. As the air cylinder unit 156 is actuated to extend or retract the piston rod 157 thereof in the Z direction, the vacuum suction device 158 lifts up the glass plate 2 placed on the endless belt 3, or clamps the glass plate 2, which is placed on the endless belt 3, in cooperation with the supporting mechanism 15 with the endless belt 3 interposed therebetween so as to fix the glass plate 2 onto the endless belt 3.

The lifting mechanism 152 is formed in the same way as the lifting mechanism 151 and has an air cylinder unit 161 mounted on the movable base 155 common to the lifting mechanism 151 as well as a vacuum suction device 163 attached to a distal end of a piston rod 162 of the air cylinder unit 161. As the air cylinder unit 161 is actuated to lower the piston rod 162 thereof in the Z direction, the vacuum suction device 163 places the glass plate 2, which is being sucked, onto the endless belt 3.

The reciprocating mechanism 153 includes: the movable base 155; an electric motor 166 attached to an upper frame 165 of the frame 16; a threaded shaft 168 supported rotatably by the upper frame 132 of the frame 16 through a bearing 167; pulleys 169 and 170, which are respectively secured to an output rotating shaft of the electric motor 166 and one end of the threaded shaft 168, as well as a belt 171 trained between the pulleys 169 and 170, so as to transmit the rotation of the output rotating shaft of the electric motor 166 to the threaded shaft 168; a nut 172 threadedly engaged with the threaded shaft 168 and secured by being fixed to an upper surface of the movable base 155; a pair of rails 173 formed on the upper frame 132; and a slider 174 fitted slidably to the pair of rails 173 and secured by being attached to the upper surface of the movable base 155.

The movable base 155, which is suspended from and supported by the upper frame 132 movably in the Y direction through the slider 174, is adapted to reciprocate linearly in the Y direction while being guided by the pair of rails 173 when the threaded shaft 168 is rotated by means of the pulleys 169 and 170 and the belt 171 as the electric motor 166 is operated to rotate the output rotating shaft thereof.

As the reciprocating mechanism 153 is operated, the carrying-in and carrying-out means 11 causes the lifting devices 151 and 152 to reciprocate linearly in the Y direction. In this linear reciprocating motion, the lifting device 152 lifts up the glass plate 2 to be subjected to bend-breaking and placed on a conveying device 181 on the entrance side, carries it into the region 5 surrounded by the supporting member 4, and places it on the upper surface of the upper side portion of the endless belt 3, whereas the lifting device 151 carries the glass plate 2, subjected to bend-breaking and placed on the upper surface of the upper side portion of the endless belt 3, out of the region 5 surrounded by the supporting member 4, and places it on a conveying device 182 on the exit side.

The tension imparting means 12 includes a pair of air cylinder units 185 and 186 supported by the bracket 21, and the piston rod of the air cylinder unit 185 rotatably supports the freely rotating drum 19, while the piston rod of the air cylinder unit 186 rotatably supports the freely rotating drum 20.

The tension imparting means 12 imparts tension to the endless belt 3 by means of the freely rotating drums 19 and 20 through the pneumatic resiliency of the air cylinder units 185 and 186, thereby tensioning the endless belt 3. The tension imparting means 12 may not be provided if the endless belt 3 can be tensioned as desired by the positional adjustment of the driving drum 17, the driven drum 18, and the freely rotating drums 19 and 20.

The traveling device 13 includes an electric motor 191 mounted on the base 23; the driving drum 17 and driven drum 18; the freely rotating drums 19 and 20; and pulleys 192 and 193, which are respectively secured to an output rotating shaft of the electric motor 191 and a rotating shaft of the driving drum 17, as well as a belt 194 trained between the pulleys 192 and 193, so as to transmit the rotation of the output rotating shaft of the electric motor 191 to the rotating shaft of the driving drum 17. The driving drum 17 and the driven drum 18 are respectively attached rotatably to frames 195 and 196 which are supported by the intermediate base 22.

As the electric motor 191 is operated to rotate the output rotating shaft thereof, the traveling device 13 rotates the driving drum 17 by means of the pulley 192, the belt 194, and the pulley 193. As the driving drum 17 is rotated, the endless belt 3 is made to travel in, for example, the A direction, thereby allowing the endless belt 3 to convey cullet, obtained by bend-breaking on the endless belt 3, in the A direction and discharge the cullet to outside the region 5.

The supporting mechanism 15 includes a rectangular receiving plate 201 and a column 202 for supporting the receiving plate 201, and the column 202 is supported by the bracket 21 through a horizontal member 203.

The supporting mechanism 15 supports from below the glass plate 2, which is placed on the endless belt 3, through the endless belt 3 on the upper surface 51 of the receiving plate 201, and clamps the glass plate 2 in cooperation with the vacuum suction device 158 so as to fix it onto the endless belt 3.

The conveying device 181 on the entrance side includes an endless belt 211 on which the glass plate 2 to be bend-broken is placed, as well as a traveling device (not shown) for causing the endless belt 211 to travel. The conveying device 181 accurately carries in the glass plate 2 to be bend-broken to a predetermined position through the traveling of the endless belt 211 based on the operation of the traveling device.

The conveying device 182 on the exit side includes an endless belt 212 on which the glass plate 2 subjected to bend-breaking is placed, as well as a traveling device (not shown) for causing the endless belt 212 to travel. The conveying device 182 conveys the glass plate 2 subjected to bend-breaking, to an ensuing working process, e.g., a process for grinding and polishing bent-broken edges, through the traveling of the endless belt 212 based on the operation of the traveling device.

The glass plate bend-breaking machine 1 is further comprised of a controller including a microcomputer and the like, and the controller controls the operation of the electric motors, the air cylinder units, the vacuum suction devices, and the like through numerical control commands programmed in advance. Since such a controller itself is publicly known, and a detailed description thereof will be omitted.

The glass plate bend-breaking machine 1 performs the bend-breaking operation with respect to the glass plate 2 in the following manner.

First, the glass plate 2, on which the predetermined bend-breaking lines (main cut lines) 221 have been scored thereon in advance as cut lines, is disposed in an accurate position by the endless belt 211. Incidentally, such predetermined bend-breaking lines 221 may be formed by an end cut line (auxiliary cut line) forming mechanism which includes such as the air cylinder unit 89, the cutter block 93, and the electric motor 94 in the press-breaking device 9 in the glass plate bend-breaking machine 1 of this embodiment.

Upon completion of one bend-breaking, the respective vacuum suction devices 158 and 163 which have already been lowered by the actuation of the air cylinder units 156 and 161 are operated, and the already bend-broken glass plate 2 on the endless belt 3 is sucked by the vacuum suction device 158, while the glass plate 2 which is to be bend-broken next and placed on the endless belt 211 is sucked by the vacuum suction device 163. Subsequently, the air cylinder units 156 and 161 are actuated, and the already bend-broken glass plate 2 on the endless belt 3 is lifted up by the vacuum suction device 158, while the glass plate 2 which is to be bend-broken and placed on the endless belt 211 is lifted up by the vacuum suction device 163.

After lifting up, the electric motor 166 of the reciprocating mechanism 153 is operated to forward the movable base 155, and the already bend-broken glass plate 2 lifted up by the vacuum suction device 158 is carried onto the endless belt 212 out of the region 5 surrounded by the supporting member 4, while the glass plate 2 which is to be bend-broken from now and lifted up by the vacuum suction device 163 is carried onto the endless belt 3 and into the region 5 surrounded by the supporting member 4.

During this carrying-out and carrying-in operation, when the electric motor 191 is operated to cause the endless belt 3 to travel in the A direction in the state in which the glass plate 2 is lifted up, the bent-broken cullet remaining on the upper side portion of the endless belt 3 is conveyed in the A direction in conjunction with the traveling of the endless belt 3, and is discharged. After the discharge of the bend-broken cullet, the operation of the electric motor 191 is stopped to stop the traveling of the endless belt 3 in the A direction.

After carrying-in and carrying-out, the air cylinder units 156 and 161 are actuated again to lower the vacuum suction devices 158 and 163. After the vacuum suction devices 158 and 163 are lowered to predetermined positions, the sucking operation of the vacuum suction devices 158 and 163 is stopped, and the bent-broken glass plate 2 is placed on the endless belt 212 by the vacuum suction device 158, while the glass plate 2 to be bend-broken from now is placed on the endless belt 3 by the vacuum suction device 163. Subsequently, the air cylinder units 156 and 161 are reversely actuated to raise the vacuum suction devices 158 and 163. Further, the electric motor 166 of the reciprocating mechanism 153 is reversely operated to cause the movable base 155 to undergo returning motion, and the vacuum suction device 163 is moved to above the endless belt 211, while the vacuum suction device 158 is moved to above the endless belt 3.

During the reciprocating motion of the vacuum suction devices 158 and 163, the glass plate 2 to be bend-broken next is carried into the predetermined position by the operation of the endless belt 211.

Upon return of the vacuum suction devices 158 and 163 to their original positions, the air cylinder units 156 and 161 are actuated again to lower the vacuum suction devices 158 and 163. After the vacuum suction devices 158 and 163 are lowered to their predetermined positions, the glass plate 2 placed on the upper side portion of the endless belt 3 by the vacuum suction device 158 is pressed against the endless belt 3 by means of the pneumatic resiliency based on the air cylinder unit 156, while the glass plate 2 placed on the endless belt 211 by the vacuum suction device 163 is pressed against the endless belt 211 by means of the pneumatic resiliency based on the air cylinder unit 161.

As a result, the glass plate 2 placed on the upper side portion of the endless belt 3 is clamped at a central portion thereof by the vacuum suction device 158 and the receiving plate 201 with the endless belt 3 interposed therebetween, and is securely held and fixed on the upper side portion of the endless belt 3.

Subsequently, the electric motors 59 and 59a as well as 72 and 72a are operated to move the glass plate receiving devices 7 and 7a in the X and Y directions, so that the glass receiving surfaces 6 and 6a will be disposed below the cutter wheels 92 and 92a. At the same time, the electric motors 114 and 114a as well as 135 and 135a are operated to move the press-breaking devices 9 and 9a in the X and Y directions, so that the cutter wheels 92 and 92a are moved toward an outer edge 220 of the glass plate 2 (outer edge of the unworked plate glass) by respectively using one flection point of the predetermined bend-breaking line 221 as a starting point. When the cutter wheels 92 and 92a are respectively moved from the flection points of the predetermined bend-breaking line 221, the air cylinder units 89 and 89a are concurrently actuated to bring the cutter wheels 92 and 92a into contact with the glass plate 2, thereby forming end cut lines (auxiliary cut lines) 222 on the glass plate 2 by means of the cutter wheels 92 and 92a.

During the formation of the end cut lines 222, the electric motors 94 and 94a are operated to cause the edges of the cutter wheels 92 and 92a to be directed in a direction in which the end cut lines are formed. In addition, during the formation of the end cut lines, the rotary bodies 108 and 109 and rotary bodies 108a and 109a remain raised in a state in which their rotatable surfaces 301 and 302 as well as 301a and 302a are respectively not brought into contact with the upper surface of the glass plate 2.

After one end cut line 222 is thus formed, the press-breaking devices 9 and 9a and the glass plate receiving devices 7 and 7a are consecutively moved to respective starting points of end-cut-line forming positions which are respective flection points of the predetermined bend-breaking line 221, and the cutter wheels 92 and 92a, after being moved to the respective starting points, respectively effect the formation of the respective end cut lines 222 within the region 5. During the end-cut-line formation, the glass plate receiving devices 7 and 7a are moved in correspondence with the movement of the cutter wheels 92 and 92a so that the glass plate receiving surfaces 6 and 6a receive the pressing force of the cutter wheels 92 and 92a through the glass plate 2 and the endless belt 3.

Upon completion of the end-cut-line formation, the air cylinder units 89 and 89a are then actuated to raise the cutter wheels 92 and 92a, thereby canceling the contact between the cutter wheels 92 and 92a and the glass plate 2.

Figure 9:
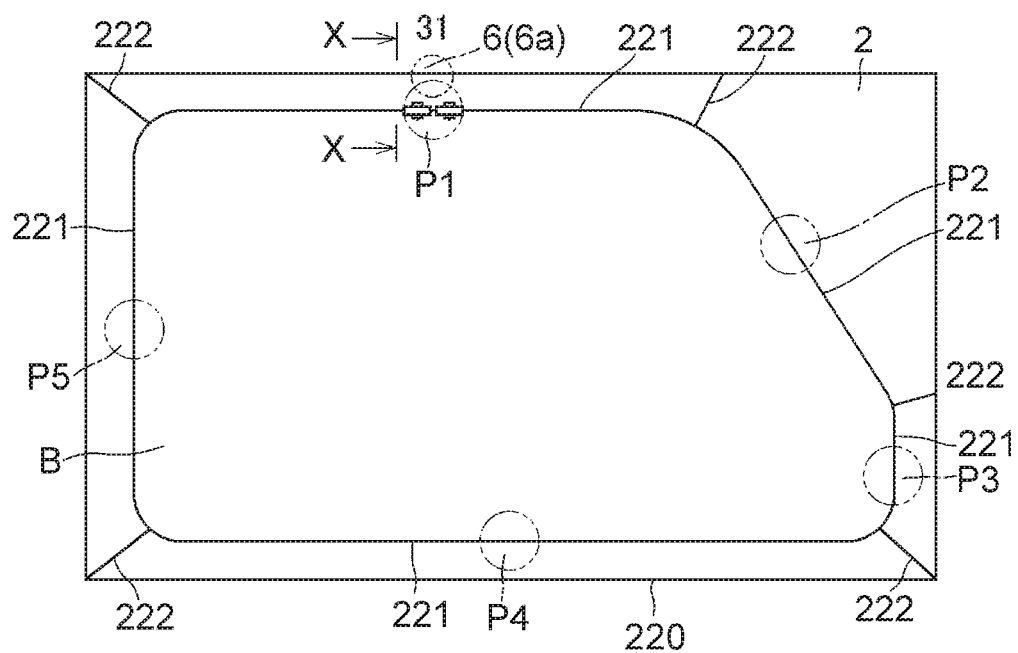
FIG. 9 is a diagram for explaining the operation in the embodiment shown in FIG. 1.
Figure 10:
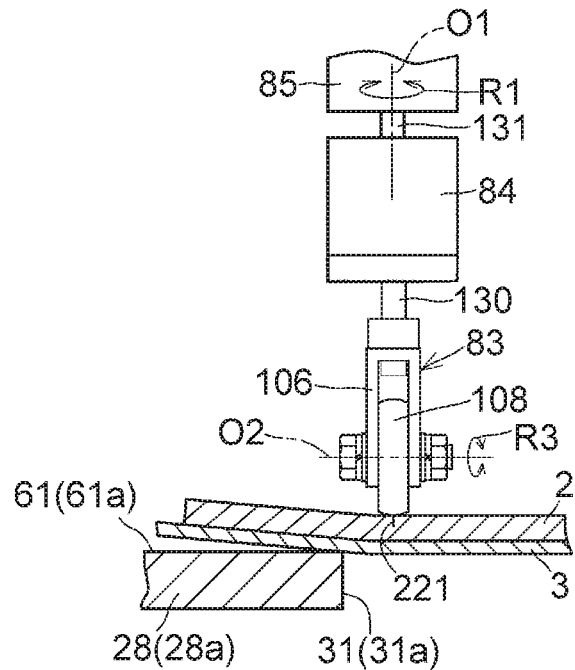
FIG. 10 is an explanatory cross-sectional view taken in the direction of arrows along line X-X shown in FIG. 9.

Further, the electric motors 59 and 59a as well as 72 and 72a are operated to move the glass plate receiving devices 7 and 7a in the X and Y directions, such that, as shown in FIGS. 9 and 10, each of the glass plate receiving surfaces 6 and 6a is disposed at the respective position of the press-breaking positions P1, P2, P3, P4 or P5, i.e., at such a position that it is outside a region B surrounded by the predetermined bend-breaking lines 221, i.e., the cut lines on the glass plate 2, and that, in a plane view, the circular outer contour 31 of each of the glass plate receiving surfaces 6 and 6a is in proximity to the predetermined bend-breaking line 221 on the glass plate 2. Similarly, the electric motors 114 and 114a as well as 135 and 135a are operated to move the press-breaking devices 9 and 9a in the X and Y directions, such that each of the rotatable surfaces 301 and 302 as well as 301a and 302a of the rotary bodies 108 and 109 as well as 108a and 109a is disposed above the predetermined bend-breaking line 221 and above each of the parts 81 and 82.

Figure 6:
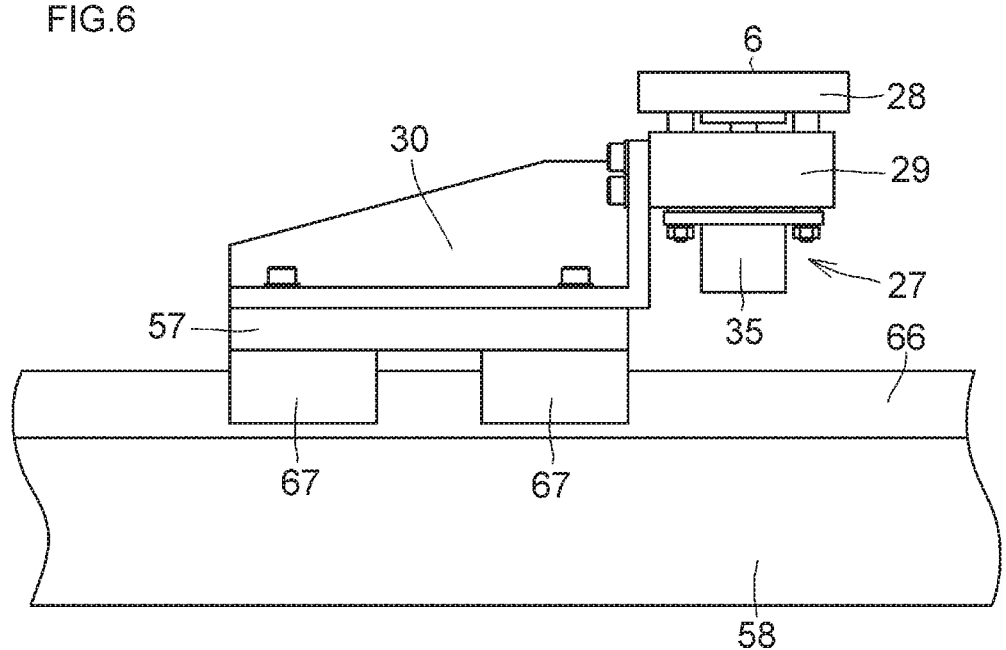
FIG. 6 is a diagram for explaining the operation of the glass plate receiving device in the embodiment shown in FIG. 1.
Figure 7:
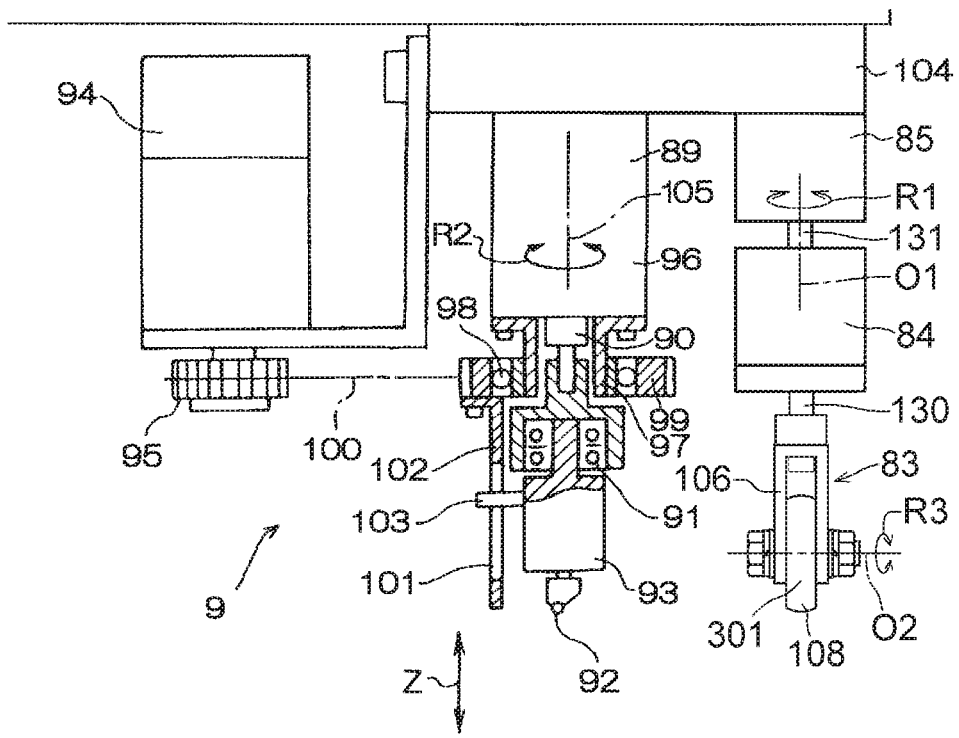
FIG. 7 is a detailed explanatory view of a press-breaking device in the embodiment shown in FIG. 1.
Figure 8:
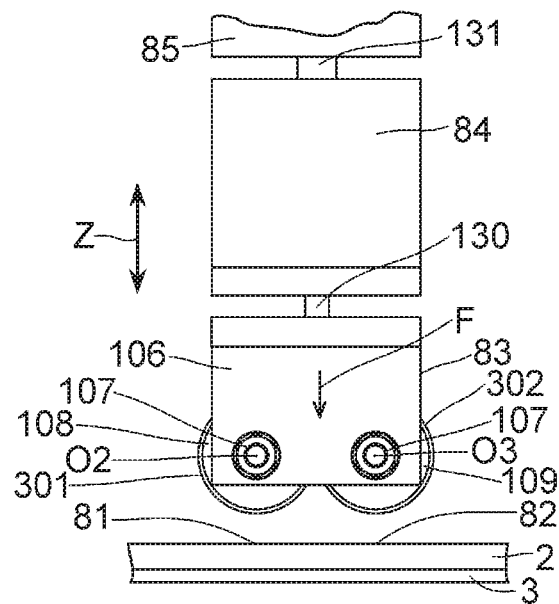
FIG. 8 is an explanatory side elevational view of a pressing body in the embodiment shown in FIG. 1.

In a state in which respective lower ends of the rotatable surfaces 301 and 302 as well as 301a and 302a and the parts 81 and 82 are opposed to each other in the Z direction, the cylinder units 35 and 35a are actuated, as shown in FIG. 6, to raise the glass plate receiving surfaces 6 and 6a by 1 mm to 5 mm or thereabouts through the movable receiving members 28 and 28a, thereby subjecting the glass plate 2 outside the region B to deflection which is directed upwardly by using a vicinity of the predetermined bend-breaking line 221 on the glass plate 2 as a starting point. In the state in which such deflection has occurred, the air cylinder units 84 and 84a are actuated to lower the pressing bodies 83 and 83a, as shown in FIG. 10, whereby the respective ones of the rotatable surfaces 301 and 302 as well as 301a and 302a are brought into contact with the parts 81 and 82 on the upper surface of the glass plate 2 at the respective positions of the press-breaking positions P1, P2, P3, P4 and P5, thereby press-breaking the glass plate 2 along each predetermined bend-breaking line 221 and press-breaking the glass plate 2, which is located outside the region B and between the end cut lines 222, from the glass plate 2 located inside the region B. The glass plate receiving surfaces 6 and 6a and the rotatable surfaces 301 and 302 as well as 301a and 302a are returned to their original positions by the lowering of the glass plate receiving surfaces 6 and 6a due to the reverse operation of the cylinder units 35 and 35a after press-breaking and by the raising of the pressing bodies 83 and 83a due to the reverse operation of the cylinder units 84 and 84a. After this return, the glass plate 2 outside the region B is discharged as bend-broken cullet by the traveling in the A direction of the endless belt 3.

When the above-described press-breaking is finished, and the glass plate 2 bend-broken along the predetermined bend-breaking lines 221 is obtained, the foregoing operation is repeated.

The glass plate bend-breaking machine for the glass plate 2 in accordance with the embodiment includes the supporting mechanism 15 by which the glass plate 2 with the predetermined bend-breaking lines 221 formed on the upper surface, i.e., one surface, thereof as cut lines is supported at the lower surface, i.e., the other surface, of the glass plate 2; and the press-breaking devices 9 and 9a for press-breaking the glass plate 2 along the predetermined bend-breaking lines 221. As a result of the fact that each of the press-breaking devices 9 and 9a has the pressing body 83 for simultaneously pressing the plurality of parts 81 and 82 along the predetermined bend-breaking line 221 on the upper surface of the glass plate 2 at the time of press-breaking the glass plate 2 along the predetermined bend-breaking lines 221 at the respective press-breaking positions P1, P2, P3, P4 and P5 on the glass plate 2, the pressing body 83 is adapted to simultaneously press the plurality of parts 81 and 82 along the predetermined bend-breaking line 221 on the upper surface of the glass plate 2 at the time of press-breaking the glass plate 2 along the predetermined bend-breaking lines 221, so that stable bend-breaking can be effected at the respective bend-breaking positions P1, P2, P3, P4 and P5.

It should be noted that, in addition to the end-cut-line formation, the predetermined bend-breaking line 221 may be formed by the press-breaking devices 9 and 9a of the glass plate bend-breaking machine 1. In addition, with the glass plate bend-breaking machine 1, press-breaking alone may be effected, and the end-cut-line formation may be effected in a preceding process, in which case the cutter wheels 92 and 92a and the like may be omitted.

Further, in the above-described embodiment, the end-cut-line formation and press-breaking with respect to the glass plate 2 are effected in an apportioned manner by providing the pair of glass plate receiving devices 7 and 7a, the pair of moving devices 8 and 8a, the pair of press-breaking devices 9 and 9a, and the pair of moving devices 10 and 10a. For example, the glass plate receiving device 7 and the press-breaking device 9 handle in an apportioned manner a half area in the X direction of the region 5, while the glass plate receiving device 7a and the press-breaking device 9a handle in an apportioned manner a remaining half area in the X direction of the region 5. However, the glass plate bend-breaking machine may be alternatively constructed by being provided with one device, respectively, or by providing three or more devices, respectively. In addition, such apportioned operation of the end-cut-line formation and press-breaking need not be effected simultaneously, and may be effected with a necessary interval, as required.

Figure 11:
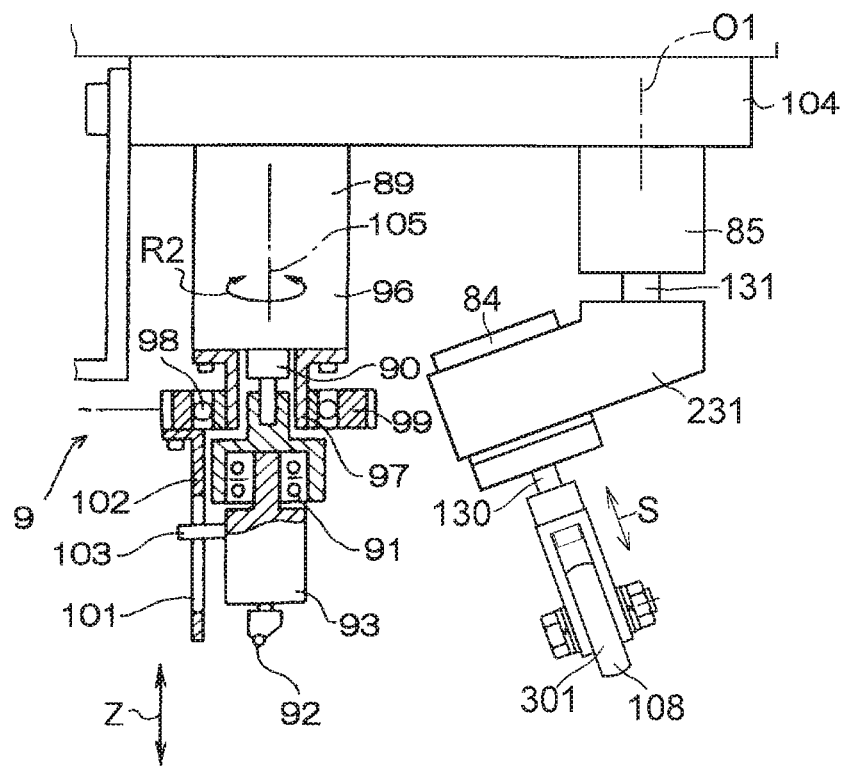
FIG. 11 is a detailed explanatory view of another preferred specific embodiment of the press-breaking device in the present invention.

Furthermore, in the above-described embodiment, the pressing body 83 is moved in the Z direction by the extension or retraction of the piston rod 130 to cause the rotatable surfaces 301 and 302 to be brought into contact with the parts 81 and 82 on the upper surface of the glass plate 2, to thereby press-break the glass plate 2. Alternatively, however, as shown in FIG. 11, a suspending member 231 may be connected and fixed to the output rotating shaft 131, and the air cylinder unit 84 may be connected and fixed to the suspending member 231 to allow the piston rod 130 to advance or retreat in an oblique direction intersecting the Z direction in operation, such that as the rotatable surfaces 301 and 302 are brought into contact with the parts 81 and 82 of the glass plate 2 by the extension of the piston rod 130, the rotatable surfaces 301 and 302 press the glass plate 2 in an obliquely downward direction and kick out the glass plate 2 located outside the region B toward the outer edge 220 of the glass plate 2 away from the glass plate 2 located inside the region B, to thereby press-break the glass plate 2.

Figure 12:
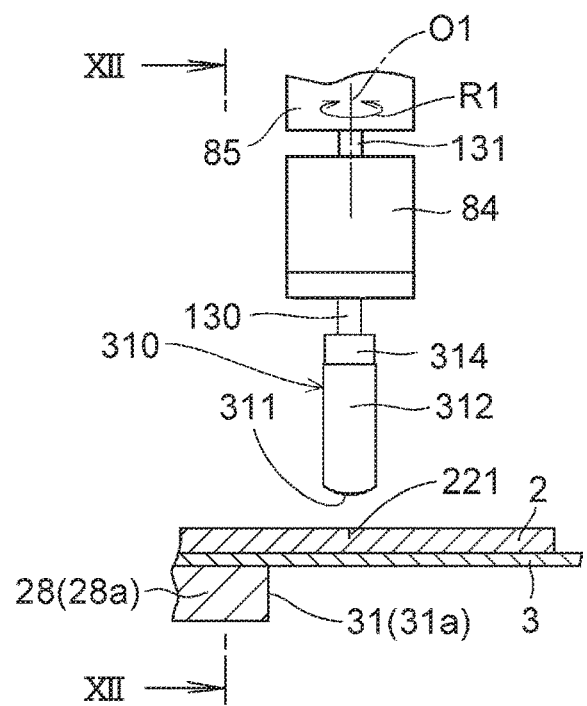
FIG. 12 is a detailed explanatory view of another preferred specific embodiment of the pressing body in the present invention.
Figure 13:
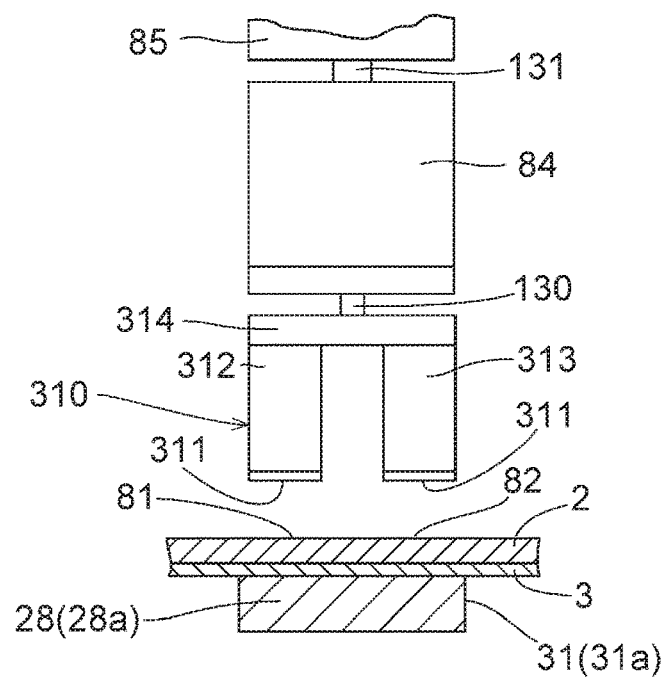
FIG. 13 is an explanatory cross-sectional view taken in the direction of arrows along line XII-XII shown in FIG. 12.

In addition, in the above-described embodiment, the pressing body 83 which simultaneously presses the parts 81 and 82 has the rotatable surfaces 301 and 302. Alternatively, however, the pressing body 83 may have a nonrotatable flat surface or a nonrotatable curved convex surface constituted by a partial spherical surface or a partial cylindrical surface. For example, as shown in FIGS. 12 and 13, a pressing body 310 for simultaneously pressing the parts 81 and 82 may have a pair of rod-like bodies 312 and 313 each having at a lower end thereof a curved convex surface 311 constituted by a partial cylindrical surface as a contacting surface which does not rotate, as well as a base 314 to which the pair of rod-like bodies 312 and 313 are mounted and which is connected and fixed to the piston rod 130 of the air cylinder unit 84. At the time of press-breaking the glass plate 2 along the predetermined bend-breaking lines 221, such a pressing body 310 at respective linear lower ends of the curved convex surfaces 311 thereof extending in the same direction as the predetermined bend-breaking line 221 is lined along the predetermined bend-breaking line 221 and simultaneously presses the respective parts 81 and 82 located at the predetermined bend-breaking line 221.

In addition, although, in the above-described embodiments, each of the glass plate receiving surfaces 6 and 6a is raised and lowered by each of the raising and lowering means 27 and 27a, the raising and lowering means 27 and 27a may not be provided, and the glass plate receiving surfaces 6 and 6a may be constantly disposed 1 mm to 5 mm or thereabouts above the upper surface 51.

Further, in the above-described embodiments, the cutter wheel 92 is rotated in the R2 direction about the axis 105 by the electric motor 94 serving as the rotating means for rotating the rotary body 83 about the axis (rotational axis) O1 in the R1 direction, and the pressing body 83 is rotated about the axis O1 in the R1 direction by the electric motor 85. Alternatively, however, an electric motor which is common to the rotation of the cutter wheel 92 and the pressing body 83 may be mounted on the base 104, and the cutter wheel 92 and the pressing body 83 may be rotated about the axis 105 in the R2 direction by means of the air cylinder unit 89 and by means of the air cylinder unit 84, respectively.

Furthermore, in the above-described embodiments, press-breaking is effected without moving the base 104 in the X and Y directions. Alternatively, however, in press-breaking, after, for example, the rotatable surfaces 301 and 302 or the curved convex surfaces 311 have come into contact with the upper surface of the glass plate 2 at the parts 81 and 82, the base 104 may be moved by the moving device 10 in a direction perpendicular to the predetermined bend-breaking line 221 such that the glass plate 2 outside the region B is pushed out by the rotatable surfaces 301 and 302 or the curved convex surfaces 311 toward the outer edge 220 of the glass plate 2 away from the glass plate 2 inside the region B.

DESCRIPTION OF REFERENCE NUMERALS

1: bend-breaking machine
2: glass plate
3: endless belt
4: supporting member
5: region
6, 6a: glass plate receiving surface
7, 7a: glass plate receiving device
8, 8a: moving device
9, 9a: press-breaking device
83: pressing body
84: air cylinder unit
85: electric motor

The invention claimed is:

1. A glass plate bend-breaking machine comprising:
a flexible member on which a glass plate with a cut line formed on one surface thereof is placed;
a glass plate support having a supporting surface configured to support the glass plate with the cut line formed on one surface thereof at the other surface of the glass plate through said flexible member;
a glass plate receiving device having a glass plate receiving surface configured to receive the glass plate from the other surface of the glass plate through said flexible member;
a motor configured to move said glass plate receiving device;
a press-breaking device configured to press-break the glass plate on the cut line, and
a base configured to move said press-breaking device,
wherein said press-breaking device has a pressing body configured to simultaneously press a plurality of parts on the cut line on the one surface of the glass plate at a time of press-breaking the glass plate along the cut line,
wherein the glass plate receiving surface is configured to be moved in an upward direction above the supporting surface, thus deflecting the end portion of the glass plate which is located outside the region in an upward direction, and the pressing body is configured to be lowered while the end portion of the glass plate is in the upwardly deflected state to effect breaking of the glass plate along the cut line.

2. The glass plate bend-breaking machine according to claim 1, wherein said pressing body has a flat surface or a curved convex surface constituted by a partial spherical surface or a partial cylindrical surface, the flat surface or the curved convex surface being configured to come into contact with at least one part among the plurality of parts in pressing of the plurality of parts on the cut line on the one surface of the glass plate at the time of press-breaking the glass plate along the cut line.

3. The glass plate bend-breaking machine according to claim 1, further comprising a rotary body having a contacting surface which is rotatably or nonrotatably brought into contact with the at least one part among the plurality of parts in pressing of the plurality of parts on the cut line on the one surface of the glass plate at the time of press-breaking the glass plate along the cut line.

4. The glass plate bend-breaking machine according to claim 3, wherein said rotary body has a rotational axis which extends in a direction intersecting a direction along the cut line, and the contacting surface is configured to be brought into contact with the at least one part among the plurality of parts rotatably or nonrotatably about the rotational axis in pressing of the plurality of parts on the cut line on the one surface of the glass plate at the time of press-breaking the glass plate along the cut line.

5. The glass plate bend-breaking machine according to claim 1, wherein said pressing body is configured to press the one surface of the glass plate in such a manner as to straddle the cut line at at least one part among the plurality of parts along the cut line on the one surface of the glass plate at the time of press-breaking the glass plate along the cut line.

6. The glass plate bend-breaking machine according to claim 1 wherein said press-breaking device further has a motor configured to rotate said pressing body about an axis perpendicular to the one surface of the glass plate so as to allow said pressing body to effect simultaneous pressing of the plurality of parts on the glass plate along the cut line at each press-breaking position on the glass plate.

7. The glass plate bend-breaking machine according to claim 1, wherein said press-breaking device further has an air cylinder configured to impart to said pressing body a pressing force necessary for simultaneous pressing by said pressing body with respect to the plurality of parts along the cut line on the one surface of the glass plate at the time of press-breaking the glass plate along the cut line.

8. The glass plate bend-breaking machine according to claim 1, wherein the press-breaking device includes a pair of rotating bodies that are both aligned with the cut line and spaced apart from one another along a direction of the cut line.

9. The glass plate bend-breaking machine according to claim 8, wherein each of the rotating bodies has an axis that is substantially perpendicular to the cut line, the axes being spaced from one another in a direction of the cut line.

* * * * *